United States Patent [19]

Musgrave

[11] 4,205,474
[45] Jun. 3, 1980

[54] INACTIVE SPRING FOR MAGAZINE

[76] Inventor: Daniel D. Musgrave, 8201 Caraway St., Cabin John, Md. 20731

[21] Appl. No.: 968,215

[22] Filed: Dec. 11, 1978

[51] Int. Cl.² .......................... F41C 25/02; F16F 1/22
[52] U.S. Cl. ........................................... 42/50; 267/165
[58] Field of Search ...................... 42/50, 49, 6, 7, 18, 42/22; 267/165, 164, 158

[56] References Cited

U.S. PATENT DOCUMENTS

| 3,039,221 | 6/1962 | Musgrave | 42/50 |
| 3,113,811 | 12/1963 | Knowlton | 267/164 |
| 3,964,199 | 6/1976 | Musgrave | 42/50 |
| 3,999,319 | 12/1976 | Musgrave | 42/50 |

Primary Examiner—Charles T. Jordan

[57] ABSTRACT

A spring adapted for long-term installation in a limited space, in a minimum-stress condition. When thrust is desired, the spring is activated by adjusting the position of some components, resulting in a tendency for the spring to expand.

11 Claims, 10 Drawing Figures

INACTIVE SPRING FOR MAGAZINE

Many types of mechanical equipment include springs which must stand-by in a stressed condition for long periods of time. An obvious limitation on such springs is the possibility that resilience may be lost, thus rendering the mechanism inoperable.

An example of this problem is found in the ordinary cartridge magazine for firearms. For military use it would be desirable to fill the magazine with cartridges at a factory and issue it to the user in a protective wrapper. This cannot be done because of the limitation of time for keeping the magazine spring stressed. As a result, magazines and ammunition must be stored, shipped, and issued separately, an inefficient and inconvenient procedure.

The principal object of this invention is to provide a spring which can be installed in a minimum space, while in a minimal-stressed condition, and can be adjusted within the same space to a highly-stressed condition.

Another object of this invention is to provide such a spring which will be economical to fabricate.

These and other objects of the present invention will become apparent upon reference to the following specification, taken in connection with the accompanying drawings, wherein.

The drawings have been prepared for the purpose of disclosing the invention, and they do not show any particular magazine. In actual practice, this invention can be applied to various types of magazines and to other types of equipment. The drawings should not be construed as limitations on the invention.

Figure 1:
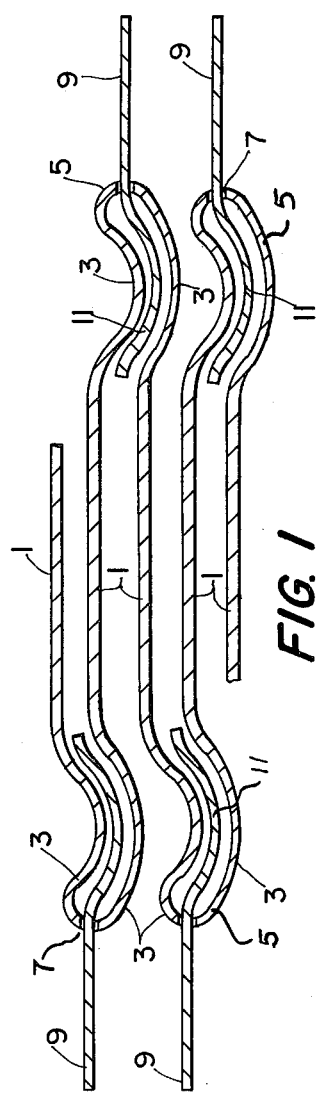
FIG. 1 is a sectional view of an inactive spring in a relaxed condition.

Referring to the drawings in detail, FIG. 1 shows a folded leaf spring comprising a plurality of substantially flat leaves 1 connected by vertices 5, and having arcuate portions 3 between the vertices and the flat leaves. Through each vertex is formed a slot 7, which is shown clearly in FIG. 6. Inserted in the slots in FIG. 1 are wedges 9, having guide portions 11. The wedges may be rigid or resilient.

In FIG. 1 the wedges are only partly inserted into each slot, and it will be noted that the guide portions are substantially similar in profile to the arcuate portions. For convenience of disclosure the parts have been drawn with considerable clearance between them. The spring shown in FIG. 1 is relaxed; that is, it has no tendency to expand vertically.

Figure 2:
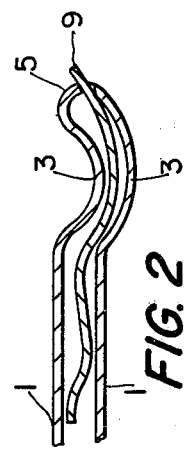
FIG. 2 shows a portion of the spring shown in FIG. 1 but the spring is in a stressed condition.
Figure 3:
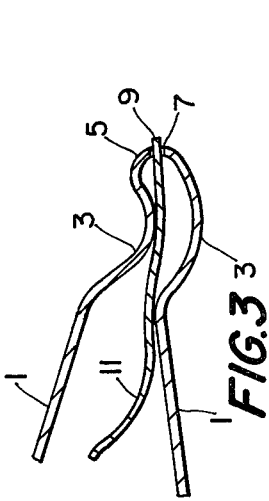
FIG. 3 shows the same portion, but expanded.

The spring can be installed in a minimum space, and there remain relaxed until thrust is needed. When the user desires the spring to expand vertically, he forces each wedge 9 into its slot as shown in FIG. 2. The flat portion of the wedge enters between the nested arcuate portions of the folded leaf spring, tending to seperate them. The weakest part of the leaf spring is the part near slot 7, so the spring will tend to expand as shown in FIG. 3.

Figure 4:
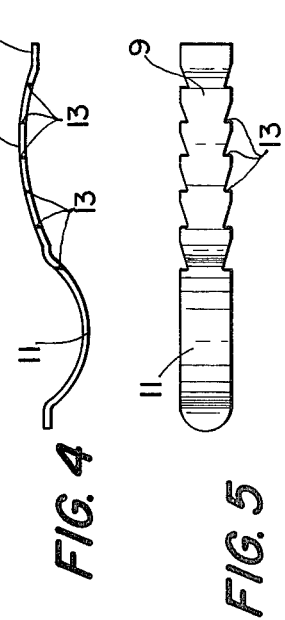
FIG. 4 is a side elevation of a wedge.

In some cases, it may be found desirable to give the wedge a curvature opposed to that of the arcuate portions 3. This is shown in FIG. 4 where wedge 9A includes curved portion 9B. Such a wedge would exert more separating force than a flat wedge of the same dimensions, when inserted in an opposed relationship.

Figure 5:
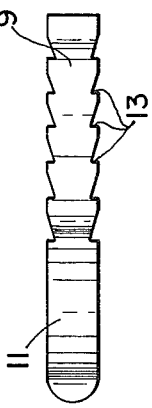
FIG. 5 is a top view of a wedge.

To insure that the wedge remains in position when pushed into the slot, it can have teeth formed on it, as shown at 13 in FIG. 5. The teeth can be slightly upset or twisted to engage the edge of the slot and prevent the wedge from backing out. To prevent the wedge from being pushed completely through the slot the outer end can be upset.

To reduce friction while the wedge is being inserted, either the wedge, the leaf spring, or both can be coated with a lubricant.

Figure 6:
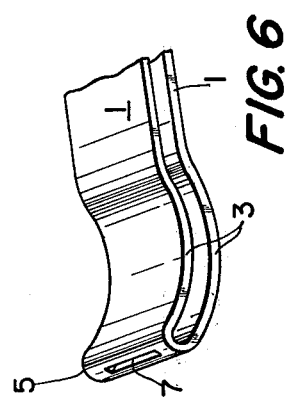
FIG. 6 is a perspective view of a portion of the spring shown in FIG. 1.
Figure 7:
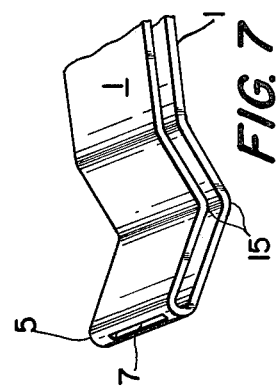
FIG. 7 is an alternate configuration of the portion shown in FIG. 6.

The arcuate portions of the leaf spring can be made with various profiles. FIG. 6 shows smoothly curved portions 3, while FIG. 7 shows portions 15 in the configuration of a pointed arch. Other forms can also be used.

Figure 8:
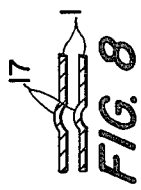
FIG. 8 is an alternate detail relating to the spring shown in FIG. 1.

For increased stiffness, the flat portions 1, of the leaf spring can be provided with longitudinal ribs 17 as shown in FIG. 8, which is a cross-section of a pair of such flat portions.

Figure 9:
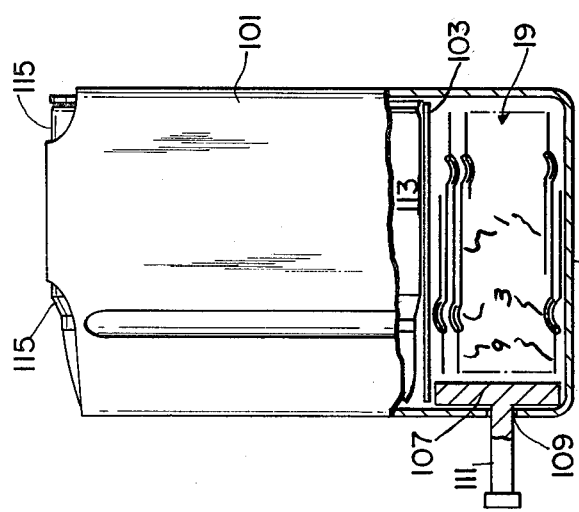
FIG. 9 shows an inactive spring installed in a cartridge magazine and relaxed.

One suggested use for this inactive spring is in a cartridge magazine such as that shown in FIG. 9. It includes a typical casing 101, holding a stack of cartridges. The lowest cartridge 113 can be seen resting on a follower 103 within the casing, while the top-most cartridge 115 is at the upper end of the magazine. An inactive spring, indicated generally at 19, is installed between the follower and floor 105 of casing 101. This spring is similar to that disclosed in FIG. 1, except that the arcuate portions at each end of the spring are oppositely oriented. In FIG. 9 the spring is relaxed.

Also positioned between the follower and the floor is a pusher block 107, having a lug 111 passing through a suitable opening 109 in the casing. The lug has an enlarged end to prevent it from passing completely through the opening.

Figure 10:
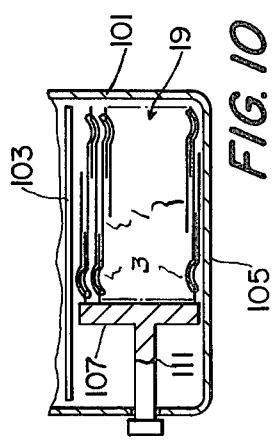
FIG. 10 shows the same spring, stressed.

When it is desired to use the magazine in a firearm the spring must be activated. This is accomplished by pushing block 107 into the casing to the position shown in FIG. 10. The wedges on the left are pushed by the block and the folded leaf spring is pushed against the wedges on the right. The wedges and arcuate portions are then in the condition shown in FIG. 2 and, if follower 103 can move, they will assume the condition shown in FIG. 3. To ease the movement of the spring, follower 103 and floor 105 can be coated with a lubricant. The floor can also be slightly inclined so as to diverge from the follower whereby the spring will move into a slightly greater space, when in the position shown in FIG. 10.

Several other variations are possible. The arcuate portions can be similarly oriented as in FIG. 1, or oppositely oriented as in FIG. 9. If it is desired that the spring expand along a curve, the shape of the arcuate portions at each end of the leaf spring can be varied. The wedges can also be varied. Other methods of causing insertion of the wedges can be employed.

There is thus disclosed a simple inactive spring which can be installed in a mechanical device in a relaxed condition, and stressed quickly when thrust is required.

What I claim is:

1. An inactive leaf spring comprising: a vertex having a passage formed therethrough; a pair of nested arcuate portions adjacent to said vertex on resilient leaves extending from said vertex; and wedge means positionally adapted for insertion between said arcuate portions via said passage in said vertex thereby tending to separate said leaves.

2. A spring as set forth in claim 1 and having a plurality of pairs of said nested arcuate portions, some of said pairs differing in configuration from others of said pairs.

3. A spring as set forth in claim 1 wherein said wedge means is substantially flat.

4. A spring as set forth in claim 1 wherein said wedge means is curved.

5. A spring as set forth in claim 1 wherein said wedge means is resilient.

6. A spring as set forth in claim 1 wherein said wedge means includes detent means adapted to retain said wedge means between said arcuate portions.

7. A spring as set forth in claim 1 wherein said wedge means includes means adapted for guiding said wedge means during said insertion.

8. A spring as set forth in claim 1 wherein at least one of the recited elements is coated with a lubricant.

9. A cartridge magazine for a firearm comprising: a casing for storing a stack of cartridges, said casing having an exit port with at least one lip; a follower adapted for urging said stack toward said port; a folded leaf spring engaging said follower and reacting against said casing and comprising; a plurality of vertices each having a passage formed therethrough; a pair of nested arcuate portions adjacent to each vertex of said plurality on resilient leaves extending from said vertex; wedge means at a position outside each said vertex and positionally adapted for insertion between said arcuate portions via said passage in each said vertex; and means adapted to move said wedge means from said position to a location between said arcuate portions.

10. A magazine as set forth in claim 9 wherein at least one of the recited elements is coated with a lubricant.

11. A magazine as set forth in claim 9 wherein said means adapted to move said wedge means comprises a pusher block having a lug extending through an opening in said casing.

* * * * *